United States Patent [19]

Mullins

[11] 3,997,140
[45] Dec. 14, 1976

[54] REFRIGERANT LINE CONNECTING TEE WITH STEP DIAMETER BUSHING

[76] Inventor: John W. Mullins, P.O. Box 20524, Oklahoma City, Okla. 73120

[22] Filed: Dec. 30, 1974

[21] Appl. No.: 537,494

[52] U.S. Cl. .............................. 251/145; 251/148; 285/177
[51] Int. Cl.² ........................................ F16K 51/00
[58] Field of Search ............. 62/292, 299; 251/145, 251/146, 151, 148; 137/315, 317, 318, 322, 798; 285/156, 177

[56] References Cited

UNITED STATES PATENTS

| 1,722,676 | 7/1929 | Parker ................................. 285/177 |
| 2,448,271 | 8/1948 | McClintock ....................... 285/177 |

FOREIGN PATENTS OR APPLICATIONS 1,147,654  6/1957  France ................................ 285/177

Primary Examiner—William R. Cline
Attorney, Agent, or Firm—Robert K. Rhea

[57] ABSTRACT

An elongated body is provided with a transverse bore for receiving a sleeve having end portions adapted for connection with selected size lines and forming a passageway. An axial threaded bore, in one end of the body, communicates with the transverse bore. The sleeve is provided with a wall aperture communicating with the threaded bore and sealing with the tip end of a valve housing threadedly engaged with the axial bore providing communication between the sleeve passageway and bore of the housing.

1 Claim, 13 Drawing Figures

U.S. Patent  Dec. 14, 1976  3,997,140
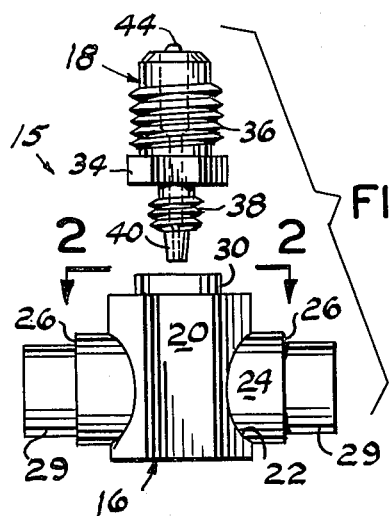
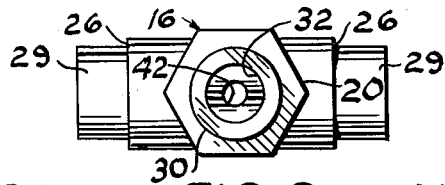
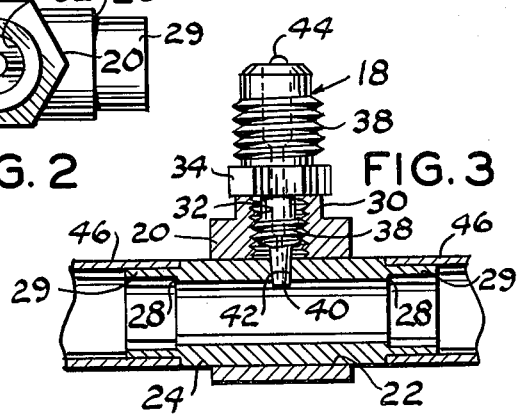
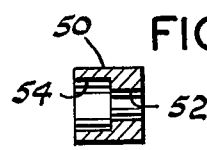
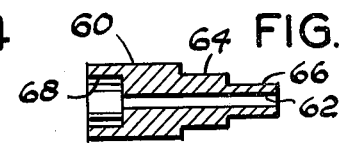
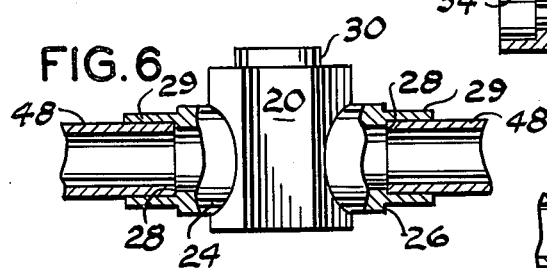
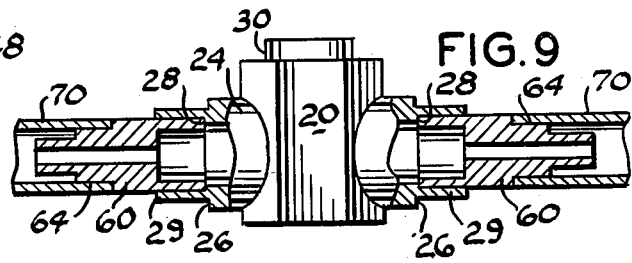
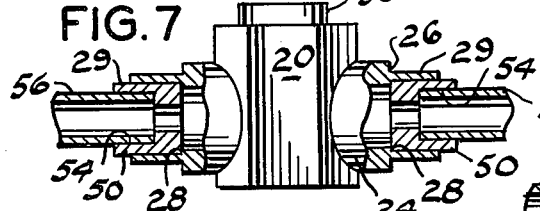
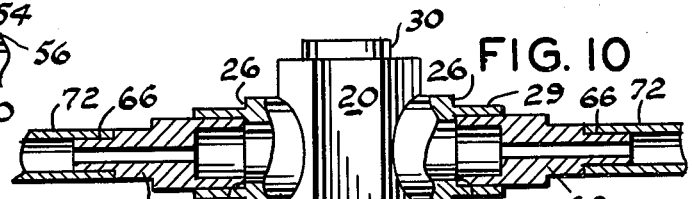
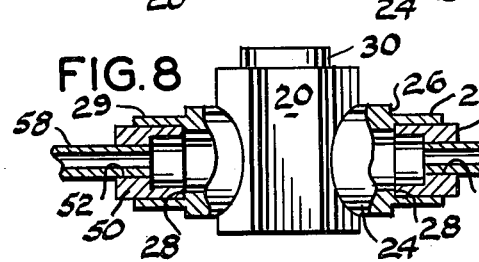
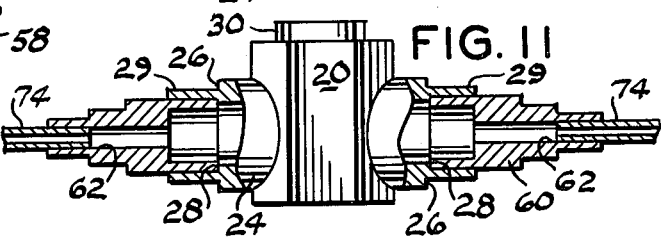
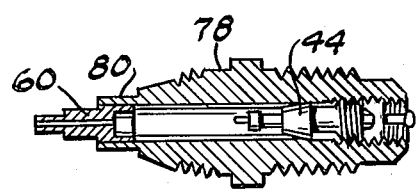
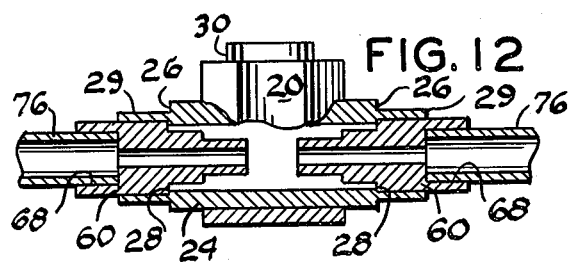

REFRIGERANT LINE CONNECTING TEE WITH STEP DIAMETER BUSHING

BACKGROUND OF THE INVENTION

1. Field of the Invention

The present invention relates to closed refrigerant systems and more particularly to a refrigerant line tee providing access to refrigerant gas contained by a line.

Closed refrigerating systems are provided with small diameter tubing for conveying refrigerant gas from the compressor to the refrigerant coils and back to the compressor. Malfunctions of such refrigerating systems is sometimes a result of an insufficient charge of gas or of moisture in the gas necessitating an evacuation of the system of refrigerant gas and a recharging with refrigerant gas. This is usually accomplished by an access valve connected with the refrigerant conductor or one installed by a service man, however, it is sometimes desired to part or cut the line between the compressor and coils for completely evacuating the system of refrigeration gas and any moisture therein.

2. Description of the Prior Art

Tees for connecting refrigerant lines and having a fitting for access to the bore of the line having usually been formed from brass which requires a considerably higher temperature than copper, for example, to join the refrigerant lines thereto. Such high temperature usually results in melting the joint connecting the access fitting to the tee and a resultant leak.

This invention provides a tee-like coupling for joining the ends of any one of a plurality of different sizes of conventional refrigerant lines at a substantially copper tube soldering temperature by the ends of a tee forming sleeve and a step diametered bushing coaxially disposed in the respective ends of the sleeve for quickly evacuating a refrigerant system and recharging it.

SUMMARY OF THE INVENTION

An elongated body is provided with a transverse bore of greater diameter than the greatest diameter refrigerant line to be connected therewith. The transverse bore coaxially receives a sleeve by a press fit with the sleeve forming the running end of the tee and projecting beyond both ends of the transverse bore. The wall of the sleeve is provided with an aperture in coaxial alignment with the body. The body is provided with an axially threaded bore communicating with the transverse bore and the aperture in the sleeve to form the bullhead end of the tee. The threaded bore receives a centrally bored valve housing opened and closed by a compressible valve for communication with the sleeve passageway. The respective ends of the sleeve are diametrically reduced and counterbored for connection with a selected one of two refrigerant lines of different diameter. A step diameter bushing is insertable into each sleeve counterbore for selective connection with any one of a plurality of different diameter size lines. The bushings are counterbored from their end opposite their step diameter end and reversible, end to end, within the sleeve counterbore for connection with still another diameter size line.

The principal object of this invention is to provide a refrigerant line connecting tee having a depressible valve core equipped valve housing connected therewith and a step diameter bushing received by the running end of the tee for selective connection with the end portions of any one of a plurality of different diameter size refrigerant lines.

BRIEF DESCRIPTION OF THE DRAWINGS

FIG. 1 is an exploded elevational view of the tee and valve housing;

FIG. 2 is a top view looking in the direction of the arrows 2—2 of FIG. 1;

FIG. 3 is a vertical cross sectional view, partially in elevation, illustrating the housing connected with the tee and a fragmentary portion of a line connected with the sleeve;

FIG. 4 is a longitudinal sectional view of a centrally bored and counterbored bushing for use with the tee;

FIG. 5 is a longitudinal sectional view of another embodiment of the bushing having a step diameter end portion;

FIG. 6 is a fragmentary cross sectional view, partially in elevation, omitting the valve housing and illustrating the sleeve connected with another size refrigerant line;

FIG. 7 is a view similar to FIG. 6 illustrating the bushing of FIG. 4 installed in each end portion of the sleeve and connecting a smaller diameter refrigerant line thereto;

FIG. 8 is a view similar to FIG. 7 illustrating the bushings reversed, end to end, and connected with a smaller size diameter line;

FIGS. 9, 10 and 11 are views similar to FIGS. 7 and 8, but illustrating the bushing of FIG. 5 installed in each end portion of the sleeve and connected with three different size diameter lines, respectively;

FIG. 12 is a view similar to FIGS. 9, 10 and 11 illustrating the bushings reversed, end to end, within the end portions of the sleeve and connecting a fourth diameter size line to the counterbored end of the bushings; and, FIG. 13 is a longitudinal sectional view, partially in elevation, illustrating the bushing of FIG. 5, to a smaller scale, installed in the bore of the valve housing for connecting the end portion of any one of a plurality of different diameter lines to the bushing and valve housing.

DESCRIPTION OF THE PREFERRED EMBODIMENTS

Like characters of reference designate like parts in those figures of the drawings in which they occur.

In the drawings:

The reference numeral 15 indicates the device, as a whole, comprising a tee portion 16 and a valve housing 18. The tee portion 16 comprises an elongated body 20, preferably formed of hexagonal stock, such as brass, to provide wrench flats for the purposes readily apparent. The body 20 is transversely drilled, as at 22, for closely receiving slidably by a press fit a sleeve 24 which forms the passageway running end of the tee. The respective end portions of the sleeve projecting beyond the body are diametrically reduced and counterbored to form external and internal annular shoulders 26 and 28, respectively, defining a thin wall end portion 29. One end portion of the body is diametrically reduced, as at 30, and axially bored and threaded, as at 32, from this end for receiving the valve housing 18.

The valve housing 18 is substantially cylindrical having wrench flats 34 intermediate its ends and external threads 36 at one end portion with the opposite end portion being diametrically reduced and externally threaded, as at 38, for engagement with the threads 32. This end portion of the valve housing beyond the threads is further diametrically reduced and provided with an outwardly converging wall surface forming tip 40 projecting beyond the threads 38 for frictional engagement in sealing relation with the wall of an aperture 42 formed in the sleeve coaxial with the body. The valve housing is centrally bored and provided with a depressible valve core 44 of the Schrader type, illustrated in side elevation (FIG. 13). Thus, the valve housing 18 provides communication with the sleeve passageway. The tee is used by parting a refrigerant line intermediate its ends and connecting the respective ends to the sleeve.

FIGS. 3 and 6, respectively, illustrate the tee when connected with two different diameter lines 46 and 48 with the end portions of the larger diameter line surrounding the thin wall end portions 29 of the sleeve and abutting the respective shoulder 26. The line 48 is received within the counterbored end portion of the sleeve and abuts the inner annular shoulder 28.

To eliminate the necessity of making a plurality of different size tees or sleeves, a bushing 50 is provided for reception by the respective counterbore of the sleeve for connecting smaller diameter lines to the tee. The bushing 50 is cylindrical with its outer surface being insertable into the respective sleeve counterbore and having a central bore 52 and a counterbore 54, respectively, formed for cooperation with the outside diameter measurement of conventional refrigerant lines smaller than the line 46 or 48.

FIGS. 7 and 8 illustrate the bushing soldered in place within the respective end of the sleeve 24 and connected, as by soldering, with two other diameter size lines 56 and 58. The end portion of the line 56 being received by the bushing counterbore 54 with the bushing 50 being reversed end to end within the respective end of the sleeve (FIG. 8) for receiving the end portions of the line 58 within the bushing bore 52.

The numerfal 60 indicates a modification of the sleeve 50 having a central bore 62 and a step diameter end portion, as at 64 and 66, progressively extending axially opposite a counterbore 68 formed in its opposite end.

As illustrated in FIGS. 9, 10 and 11, the counterbored end portion of the bushing 60 is coaxially received and soldered in place within the sleeve counterbores for receiving two progressively smaller diameter refrigerant line end portions 70 and 72, respectively, surrounding the step diameter end surfaces 64 and 66 of the bushing 60.

In FIG. 11 the bushing bore 62 receives the outside diameter surface of the smallest diameter conventional size refrigerant line 74.

FIG. 12 illustrates the bushings 60 reversed end to end and soldered within the respective sleeve counterbore for reception by the counterbore 68 of the bushing 60 of still another conventional diameter refrigerant line 76.

FIG. 13 indicates a refrigerant line connecting valve housing 78 provided with a Schrader valve 44, such as the valve disclosed by my U.S. Pat. No. 3,336,936. This valve 78 features a tubular end portion 80 which cooperatively receives one of the reversible bushings 60 for similarly connecting one end portion of a plurality of different diameter refrigerant lines thereto.

Obviously the invention is susceptible to changes or alterations without defeating its practicability. Therefore, I do not wish to be confined to the preferred embodiment shown in the drawings and described herein.

I claim:
1. A refrigerant line tee, comprising:
an elongated body having a transverse bore and having an axial threaded bore in one end portion intersecting the transverse bore;
a sleeve closely received coaxially by and projecting beyond the respective ends of the transverse bore, the respective end portions of said sleeve being diametrically reduced and counterbored to form outwardly facing outer and inner annular shoulders, respectively, for selectively entering the inside surface of the end portion of one diameter size line or surrounding the outside diameter of the end portion of a diametrically smaller line, said sleeve having an aperture in its wall communicating with the threaded bore;
an elongated bushing of uniform external diameter slidably received telescopically at either of its end portions by each counterbored end portion of said tubular member,
said bushing having a central bore and being counterbored from one end portion forming an annular internal shoulder intermediate its ends defining the juncture of two additional different inside diameter surfaces for selective reception of and connection with the outside diameter of an end portion of corresponding size refrigerant lines; and,
a valve housing threadedly engaged within the threaded bore and having a coaxial tip entering and sealing with the wall forming the aperture in said sleeve,
said valve housing having a central bore and having a depressible valve for opening and closing the central bore.

* * * * *